UNITED STATES PATENT OFFICE.

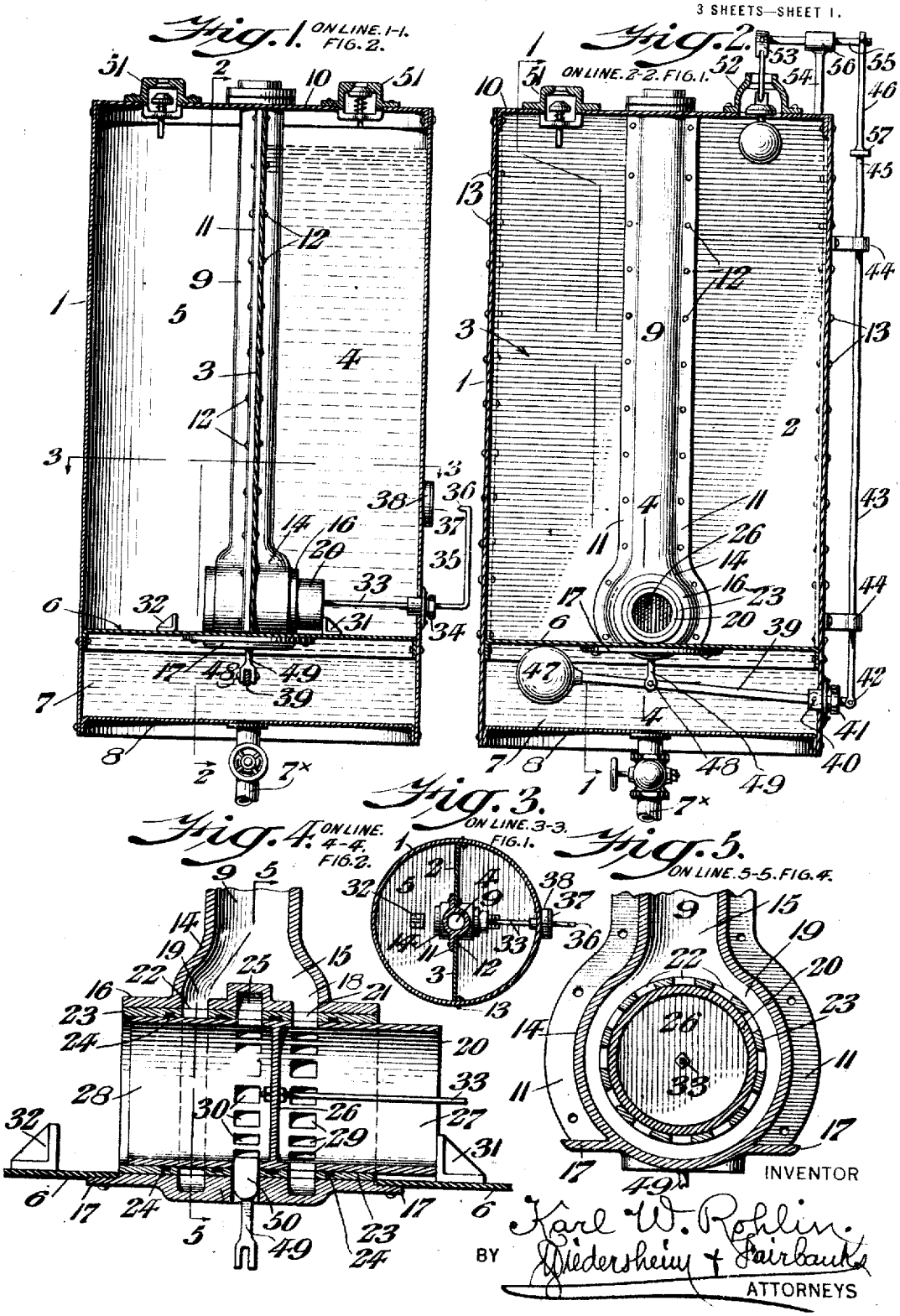

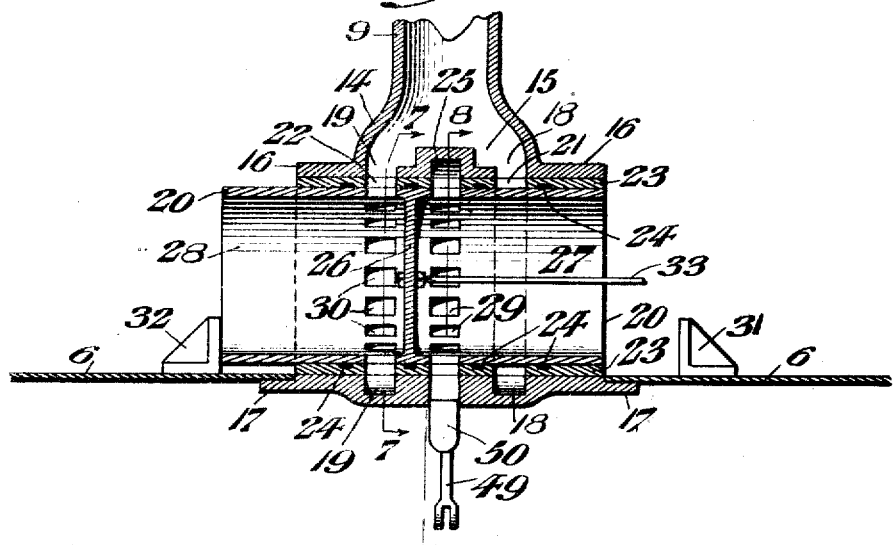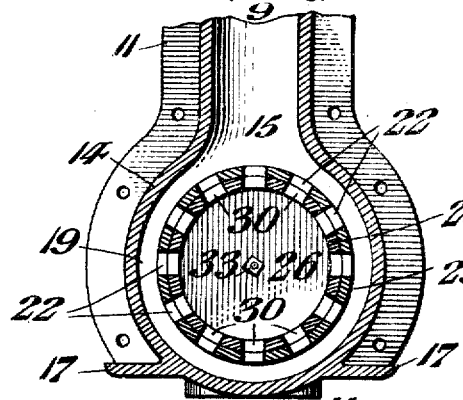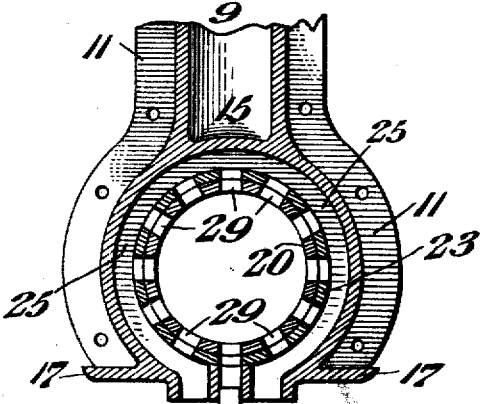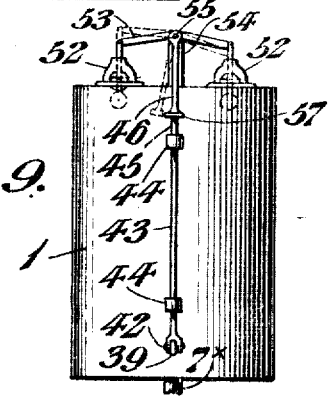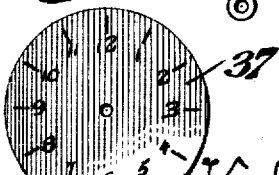

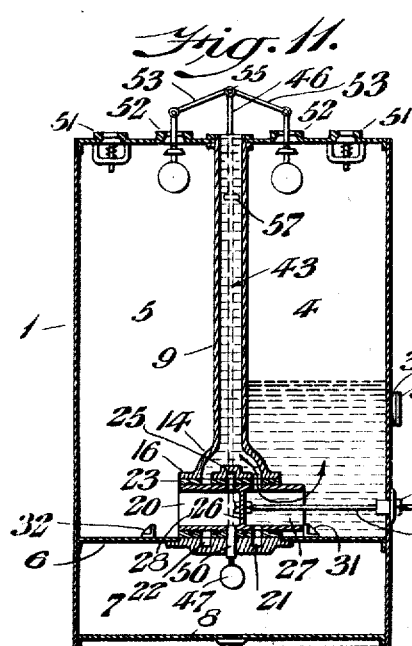
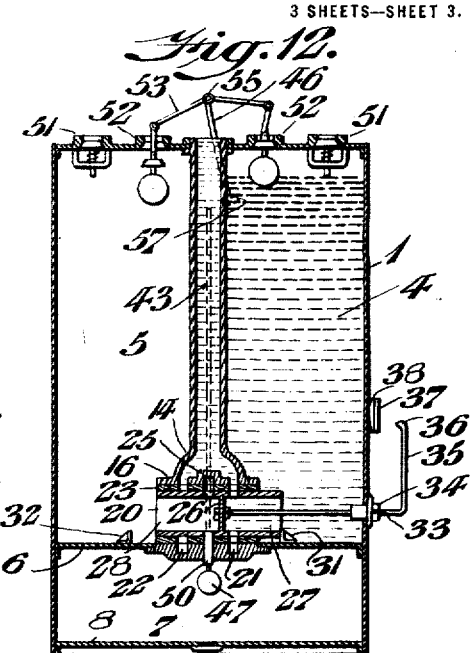
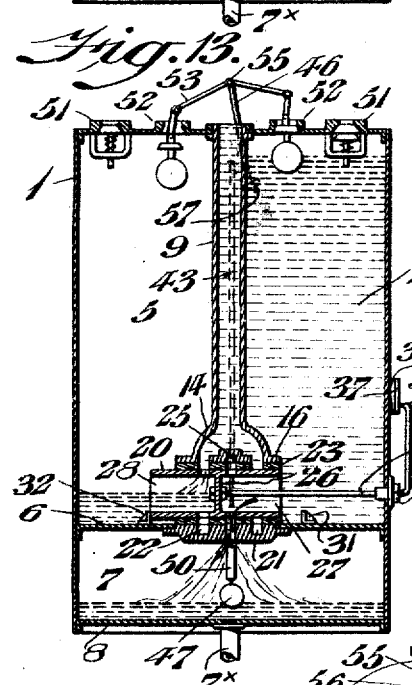
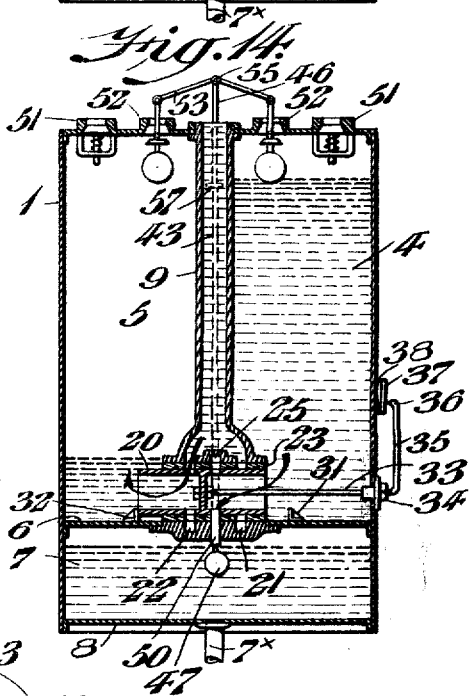
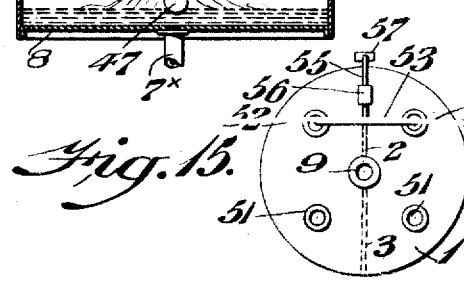

KARL W. ROHLIN, OF PHILADELPHIA, PENNSYLVANIA.

VOLUMETRIC METER.

1,242,869.  Specification of Letters Patent.  Patented Oct. 9, 1917.

Application filed March 26, 1917. Serial No. 157,369.

*To all whom it may concern:*

Be it known that I, KARL W. ROHLIN, a citizen of the United States, residing in the city and county of Philadelphia, State of Pennsylvania, have invented a new and useful Volumetric Meter, of which the following is a specification.

My invention relates in general to the class of devices which are employed for accurately measuring and indicating after measurement, fluids which are caused to pass through them.

In devices of this character, it has heretofore been usual to employ tanks or containers divided into two compartments the contents of which are to be measured and which are superposed upon a float chamber provided with a float valve connected with various forms of air valves, to control, regulate and record the flow of the fluid out of each compartment in turn and with respect to its passage through them and into and out of the float chamber.

The primary object of my invention is to improve meters of this character by providing them with a piston valve, which coöperates with both of the compartments of the tank and also with the float chamber, and has appropriate valve connections with the compartments and with registering or recording devices.

To the foregoing end, my invention comprehends improvements not only in the valve mechanism which connects the fluid compartments with the float chamber, but also in the piston valve itself which embodies specially arranged ports to effect the desired results,—it being my further object to produce a meter of great accuracy, simple in construction in that the piston valve is automatic or self-operating, cheap, and light of weight so as to be particularly adapted for oil measuring on ship-board.

With the foregoing objects in view, my invention comprehends the devices represented in the drawings, hereinafter described, and particularly set forth in the claims.

For the purpose of illustrating my invention, the drawings represent an embodiment of it which is at present preferred by me because in practice it will be found to give satisfactory and reliable results. It is to be understood, however, that the various instrumentalities in which my invention is shown as embodied can be variously arranged and organized, and that my invention broadly considered is not therefore limited to the precise arrangement and organization of the instrumentalities which are typified in the construction shown in the drawings and hereinafter described.

Referring to the drawings,

Figure 1 represents in vertical, sectional, elevation, taken on the line 1—1 of Fig. 2, a volumetric meter or measuring device embodying a good form of my invention.

Fig. 2 represents a vertical, sectional, elevation of the device shown in Fig. 1, taken on the line 2—2 of Fig. 1.

Fig. 3 represents a horizontal section, taken in reduced proportions, on the line 3—3 of Fig. 1.

Fig. 4 represents a central, vertical, sectional elevation on an enlarged scale, of the piston valve, on the line 4—4 of Fig. 2.

Fig. 5 represents a vertical, transverse, section of the piston valve, on the line 5—5 of Fig. 4.

Fig. 6 represents a view similar to that of Fig. 4, with the piston valve in the opposite position to that which it is shown as occupying in Fig. 4.

Fig. 7 represents a transverse, vertical, sectional elevation, on the line 7—7 of Fig. 6.

Fig. 8 represents a view similar to Fig. 7, on the line 8—8 of Fig. 6.

Fig. 9 represents in elevation upon a reduced scale, the device of Figs. 1 and 2,—the view being taken from the right hand side of Fig. 2.

Fig. 10 represents a measuring card of a kind that I find it convenient to employ, removed from the gage.

Figs. 11, 12, 13 and 14 are sectional views, diagrammatic in character and intended particularly to illustrate and make easy of understanding the operation of the meter as an entirety,—the drawings indicating different positions of the piston valve with relation to the fluid compartments or chambers of the tank, to the float chamber, and to the vacuum valves and vent valves one of each of which valves is applied through the cover plate of the tank to each of its two compartments. These views also show the positions which the float valve occupies with relation to the piston valve in either of its two positions.

Fig. 15 is a plan view, diagrammatic in character, of the cover plate of the tank, showing the disposition of the vacuum valves and the vent valves relatively to the fluid compartments of the tanks.

Similar numerals of reference indicate corresponding parts.

Referring to the drawings:—

1 designates a tank or fluid container, preferably cylindric, which is divided by preferably vertical partitions 2 and 3 into a right hand fluid chamber 4, and a left hand fluid chamber 5, and is also formed with a bottom partition 6, which is the upper inclosing plate of a float-chamber 7, the lower inclosing plate of which is, conveniently, the bottom plate 8 of the tank. The fluid contents of the two fluid chambers are the volumes of fluid which are to be measured.

9 designates a hollow fluid-inlet column or conduit, throughout the greater part of its length of cylindric shape, which is preferably but not necessarily disposed axially of the tank, and which preferably opens over the top or cover plate 10 of said tank so as to admit the fluid to be measured, and which, conveniently and structurally, is formed with radially extending flanges 11, which serve as a means for the attachment through bolts 12 of the inner edges of the partitions 2 and 3, the outer edges of which are conveniently bolted by bolts 13 to the walls of the tank.

Near its lower end the fluid column is enlarged, as at 14, to form a circumferentially extending valve chamber 15, of hollow cylindric form and disposed right-angularly to the axis of the column.

The connection of the column to the cover plate 10 may be such as convenience of manufacture may dictate,—the connection of the valve chamber 15, in which the column terminates, with the partition 6 of the tank, is preferably such as is particularly illustrated in Figs. 4, 5 and 6,—that is to say the circumferential enlargement which I have designated 14 extends laterally on each side to form what I term circumferential valve chamber flanges 16, which below the bottom partition 6 are formed with lips 17 which serve to support the column as an entirety and to connect it with said partition.

The enlargement 14 is also formed to embody two circumferential port-channels 18 and 19 which completely surround a cylindric, hollow, reciprocatory piston-valve 20, and are respectively formed, the right-hand port-channel 18 with ports 21, and the left-hand port-channel 19 with ports 22.

These ports 21 and 22, as a feature of mechanical construction, are preferably continued through a cylindric bushing 23 which lines the hollow interior of the enlargement 14 and the flanges 16 of the fluid column, and serves to contain packing rings 24 to pack the piston valve against leakage.

The enlargement 14 is also formed to contain and embody a central port-channel 25, that is a channel mid-way of the right and left-hand port channels 18 and 19, cast or otherwise formed or applied within the hollow circumferential interior of the enlargement 14 of the fluid column.

The cylindric hollow piston-valve 20 which reciprocates within the bushed interior of the column enlargement 14, is intermediately of its length divided by a head or diaphragm 26, so that the valve is divided into a right-hand valve chamber 27, and a left-hand valve chamber 28, each opening oppositely and outwardly, the right-hand valve chamber 27 into the right-hand fluid chamber 4 of the tank, and the left-hand valve chamber 28 into the left-hand fluid chamber 5.

29 are what I term the right-hand valve-ports and 30 the left-hand valve-ports of the piston valve 20,—being each a series of circumferentially disposed and counterpart ports, so located as, in the travel of the piston valve, to register, respectively, with the ports 21 of the channel 18, and the ports 22 of the channel 19.

Both of these series of valve ports 29 and 30 are also so longitudinally placed within the piston valve, as to be adapted to accurately register with, either the right-hand series of channel ports 21 and the central port channel 25, or with said central port channel and the left-hand series of channel ports 22,—Fig. 4 illustrating them in the position first referred to and Fig. 6 in the position last referred to.

Whichever, therefore, be the position of the piston-valve, one set of its ports will be closed, and the other set open, to the fluid column; and, likewise, one or the other set in registry with the central port channel 25.

31, 32 are stops in the bottom partition 6 to limit the movement of the slide-valve in one or the other positions of port-registry above referred to.

33 is a valve rod, in the construction shown extending from the diaphragm 26, to which it is fixedly connected, to the right hand to a packing box 34 in the outer wall of the right hand fluid-chamber 4 through which it passes and beyond which it is turned, or otherwise formed to extend upwardly to form or carry a punch or pointer 36 adapted in the movement of the piston valve hereinafter explained to punch or mark an indicating card or dial 37, Fig. 10, the rotary movement of which is effected by any preferred form of clock-mechanism 38, Fig. 1, usual in meters of this character.

Within the float chamber 7, Fig. 2, is contained a float-lever 39, fulcrumed at 40, and extending through a suitable stuffing box 41 in the outer wall of the float-chamber, to a point of pivotal connection at 42 with the lower end of a lifting or balance rod 43, slidable in bearings 44 mounted on the walls of the tank and terminating in an end or head 45 adapted to encounter a swinging rod 46 hereinafter referred to.

The float lever 39 is provided at its inner end within the float chamber 7 with the usual hollow spherical float 47, particularly illustrated in Fig. 2, and between its fulcrum 40 and its float it is pivoted at 48 to an upwardly extending arm 49 of a lock bar 50, which in the upward movement of the arm due to the lift of the float 47, by engagement with either a port 29 or a port 30, serves to lock and retain the sleeve-valve either in the position shown in Fig. 6 or in that shown in Fig. 4.

In other words, the sliding movement of the piston valve is under the control of the float-valve through the lock bar.

Upon the cover plate 10 of the tank are mounted, in the construction shown two vacuum breaker valves 51 of the puppet or other preferred type, the construction of which it is unnecessary to describe in detail, but one of which is applied so as to operate with each of the fluid-chamber compartments.

Upon the cover plate 10 are also mounted two float valves 52, which I call vent valves, of any preferred construction, which it is not necessary to describe in detail, but one of which is applied so as to operate with each of the fluid chambers of the compartments.

The two vent valves 52 are fixedly connected by the rocking beam 53, to a rocking rod 55, Figs. 2 and 9, which is oscillatory in a bearing 56 erected upon a standard 54, springing from the cover plate. To the outer end of this rocking rod 55, beyond the bearing 56, is fixedly attached a depending swinging rod 46, the heel 57 of which is adapted to occupy either of the two positions shown in full and in dotted lines in Fig. 9,—in full lines as resting upon the head 45 of the lifting rod 43 so as to prevent its being lifted, and in dotted lines as swung to the side of said head so as to permit of its being lifted.

The operation of my meter so far as it has not already been described will be best understood by reference to Figs. 11 to 15, and is as follows:—

Assuming the entire tank to be empty and the fluid to be measured to be flowing into it to fill the right-hand fluid chamber 4, as shown in Fig. 11 in which the piston valve is standing to the right as in the detail of Fig. 4, the channel ports 21 being in registry with the right-hand valve ports 29, the channel ports 22 being closed, and the lock bar 50 locking the piston valve through its entry into one of the left-hand valve ports 30, which are in registry with the central port channel 25,—the entire flow of the fluid will be in the direction of the arrow in Fig. 11 and tending to fill the fluid chamber 4.

While the foregoing registry of the valve ports remains, both of the vacuum valves 51 will be closed and both of the vent valves 52 opened.

So soon as the fluid has filled the chamber 4, so as to encounter the float of the vent valve 52 of said chamber, that valve will be closed. A this stage, the float lever 39 in the float chamber through the drop of the right-hand vent valve 52, will through the lifting rod 43 and its connections with the swinging rod 46, the rocking rod 55, and the rocking beam 53, drop so as to release the locking of the piston valve by the lock bar 50,—whereupon the pressure of the fluid in the chamber 4 entering the chamber 27 of the piston valve will act upon its diaphragm to occasion the left-hand sliding of said piston valve from the position shown in Figs. 4 and 12 into that shown in Figs. 6 and 13. The resulting closure of channel ports 21 and valve ports 29, necessitating a cessation of flow of the fluid from the valve chamber of 9 into the right-hand fluid chamber 4, and the closing of the channel ports 22 and valve ports 30, will be followed by the registry of the channel ports 22 with the left-hand valve ports 30, and the registry of the central port channel 25 with the valve port 29, and through the filling up of the float chamber, as shown in Fig. 13, the lifting of the float lever 39 to cause the locking of the lock bar 50 into one of the valve ports 29 and the temporary retention of the piston valve to the left, as shown in said Figs. 6 and 12.

The operation having taken place, the vent valve 52 of chamber 4, still remaining closed and the vacuum breaker valve 51 of that chamber having been opened, as shown in Fig. 13, the further fluid inflow will be into the fluid chamber 5, out of the fluid chamber 4 and into the valve chamber 7, until the latter is filled with a measured quantity of fluid equaling the contents of one of the fluid chambers, which thereafter is taken out of the meter through the outlet pipe 7× of the float chamber 7.

Further reference to Fig. 13 will show the relative position with respect to opening and closure of all of the valves of the meter during the only period within which a vacuum valve is operating, that is, immediately after the piston valve has started to move after having closed the inlet ports then in registry and until the end of its stroke.

Fig. 14, which is the last diagram I have deemed it necessary to use to illustrate the operation, shows the normal position of all of the several valves and floats at the time when both of the vacuum breaker valves are closed and both of the vent valves opened,—the piston valve being the left of its throw,—and during the period when the float chamber is filled, the right-hand fluid chamber 4 also filled and the left-hand fluid chamber 5 filling. The left-hand vent valve 52 will remain open until the chamber 5 has been completely filled, and will then close so as to enable the rocking beam 53 and swinging rod 46 to clear the lifting rod 43 and allow the float to drop for the reverse movement of the piston valve, after the right-hand fluid chamber 4 has entirely emptied.

The mechanism for recording the volume and the connections between the float lever 39 and the vent valve, may of course be modified. I have simply illustrated devices capable of performing the work.

The function of the float lever is primarily to control the lock bar of the piston valve,—its further function, however, as explained, being through the lifting rod and its connections to control the vent valves.

It will now be apparent that I have devised a novel and useful construction of volumetric meter, which embodies many features of advantage, and that although I have shown and described a preferred embodiment of it, it is yet to be understood that that embodiment is susceptible of modification in many particulars without departing from the spirit and scope of the invention or sacrificing any of its advantages.

Having thus described my invention, what I claim as new and desire to secure by Letters Patent, is:—

1. A volumetric meter which comprises in combination:—a float chamber,—a tank divided into two fluid chambers superposed upon said float chamber,—a piston valve in communication with both of the fluid chambers and with the float chamber,—a fluid inlet for introducing fluid to be measured into said piston valve within said tank,—ports for said piston valve which are adapted in its movement to be put into simultaneous registry with ports of the float chamber and with ports of either one of the fluid chambers,—and an outlet from the float chamber.

2. A volumetric meter which comprises in combination:—a float chamber,—a tank divided into two fluid chambers superposed upon and common to said float chamber,—a fluid inlet common to both fluid chambers for introducing fluid to be measured into either one of said chambers,—a piston valve chamber superposed upon the float chamber in which the fluid inlet terminates,—an open-ended centrally-divided piston valve within said valve chamber, which is in communication with both of the fluid chambers and with the float chamber,—ports formed in the valve chamber which are common to both the fluid inlet and the float chamber,—ports in the piston valve which are disposed upon opposite sides of its diaphragm and are adapted to open one fluid chamber to either side of said piston valve while closing the other fluid chamber to the other side of said piston valve,—and an outlet from the float chamber.

3. A volumetric meter comprising,—a float chamber,—a tank divided into two fluid chambers superposed upon and opening into said float chamber,—a fluid inlet, whereby fluid to be measured may be introduced, and having a valve chamber at one end thereof,—an open-ended centrally divided piston valve in communication with both of the fluid chambers and with the float chamber and slidable within said valve chamber—ports for said piston valve which are adapted in the movement of the valve to be put into simultaneous registry with ports of either one of the fluid chambers and also of the float chamber,—ports for both fluid chambers,—ports for the float chamber,—fluid-recording mechanism to record the volume of fluid measured by a given fluid chamber,—and means connected with the piston valve for operating said fluid-recording mechanism.

4. A volumetric meter comprising,—a float chamber,—a tank divided into two fluid chambers superposed upon and opening into said float chamber,—a fluid inlet, whereby fluid to be measured may be introduced, and having a valve chamber at one end thereof,—an open-ended centrally divided piston valve in communication with both of the fluid chambers and with the float chamber and slidable within said valve chamber—ports for said piston valve which are adapted in the movement of the piston valve to be put into simultaneous registry with ports of either one of the fluid chambers and also of the float chamber,—ports for both fluid chambers,—ports for the float chamber,—a valve rod slidable with the piston valve and extending beyond the tank,—fluid-recording mechanism to record the volume of fluid measured by a given fluid chamber,—and means connected with the piston valve for operating said fluid-recording mechanism.

5. A volumetric meter comprising,—a float chamber,—a tank divided into two fluid chambers superposed upon and opening into said float chamber and each of which is provided with a vacuum valve and a vent valve,—a fluid inlet, whereby fluid to be measured may be introduced, and having a valve chamber at one end thereof,—an open-ended centrally divided piston valve in communication with both of the fluid chambers and with the float chamber and slidable within said valve chamber,—ports for the piston valve which are adapted in the movement of the valve to be put into simultaneous registry with ports of either one of the fluid chambers and also of the float chamber,—ports for both fluid chambers.—ports for the float chamber,—and fluid-recording mechanism to record the volume of fluid measured by a given fluid chamber.

6. A volumetric meter comprising,—an outlet-provided float chamber,—a tank divided into two fluid chambers superposed upon said outlet-provided float chamber, each of said fluid chambers being equipped with a vacuum valve and a vent valve,—connective mechanism operated by a float lever in the float chamber to alternately open and close the vent valves of the fluid chambers,—a fluid inlet, whereby fluid to be measured may be introduced, and having a valve chamber at one end thereof,—an open-ended centrally divided piston valve in communication with both of the fluid chambers and with the float chamber and slidable within said valve chamber—ports for said piston valve which are adapted in the movement of the valve to be put into simultaneous registry with ports of either one of the fluid chambers and also of the float chamber,—ports for both fluid chambers,—ports for the float chamber,—fluid-recording mechanism to record the volume of fluid measured by a given fluid chamber,—and means connected with the piston valve for operating said fluid-recording mechanism.

7. A volumetric meter comprising,—a float chamber,—a tank divided into two fluid chambers superposed upon an outlet-provided float chamber,—a vacuum valve on each of said fluid chambers,—a vent valve on each of said fluid chambers,—a float lever within said float chamber,—connective mechanism operated by the float lever to alternately open and close the vent valves of the fluid chambers,—a fluid inlet, whereby fluid to be measured may be introduced, and having a valve chamber at one end thereof,—an open-ended centrally divided piston valve in communication with both of the fluid chambers and with the float chamber and slidable within said valve chamber,—ports for said piston valve which are adapted in the movement of the valve to be put into simultaneous registry with ports of either one of the fluid chambers and also of the float chamber,—ports for both fluid chambers,—ports for the float chamber, a valve rod slidable with the piston valve and extending beyond the tank,—fluid-recording mechanism to record the volume of fluid measured by a given fluid chamber,—and means connected with the piston valve for operating said fluid-recording mechanism.

In testimony whereof, I have hereunto signed my name this twenty-first day of March, 1917.

KARL W. ROHLIN.

In the presence of:—
J. BONSALL TAYLOR,
F. P. FELTON, Jr.